US012779820B2

(12) United States Patent
Kim et al.

(10) Patent No.: US 12,779,820 B2
(45) Date of Patent: Nov. 3, 2026

(54) LIGHTWEIGHT AND FLEXIBLE WEB-STRUCTURED RECYCLED LEATHER SHEET AND A MANUFACTURING METHOD THEREOF

(71) Applicant: ENR CO., LTD., Busan (KR)

(72) Inventors: Hojin Kim, Busan (KR); Wonju Kim, Busan (KR); Jinsoo Kang, Yangsan-si (KR)

(73) Assignee: ENR CO., LTD., Busan (KR)

( * ) Notice: Subject to any disclaimer, the term of this patent is extended or adjusted under 35 U.S.C. 154(b) by 0 days.

(21) Appl. No.: 18/512,683

(22) Filed: Nov. 17, 2023

(65) Prior Publication Data

US 2025/0121584 A1 Apr. 17, 2025

(30) Foreign Application Priority Data

Oct. 12, 2023 (KR) ........................ 10-2023-0135844

(51) Int. Cl.

| | |
|---|---|
| ***B32B 7/12*** | (2006.01) |
| ***B32B 5/02*** | (2006.01) |
| ***B32B 9/02*** | (2006.01) |
| ***B32B 9/04*** | (2006.01) |
| ***B32B 33/00*** | (2006.01) |
| ***B32B 38/00*** | (2006.01) |
| ***B32B 38/04*** | (2006.01) |
| ***B32B 38/08*** | (2006.01) |

(52) U.S. Cl.

CPC .............. *B32B 9/025* (2013.01); *B32B 5/022* (2013.01); *B32B 7/12* (2013.01); *B32B 9/047* (2013.01); *B32B 33/00* (2013.01); *B32B 38/04* (2013.01); *B32B 38/08* (2013.01); *B32B 38/164* (2013.01); *B32B 2038/042* (2013.01); *B32B 2260/048* (2013.01); *B32B 2305/18* (2013.01); *B32B 2305/70* (2013.01); *B32B 2307/7376* (2023.05)

(58) Field of Classification Search

None

See application file for complete search history.

(56) References Cited

U.S. PATENT DOCUMENTS 4,983,451 A * 1/1991 Sugino .................... C04B 35/83 423/447.2
7,820,569 B2 * 10/2010 Hwang ................... B32B 5/026 442/271

FOREIGN PATENT DOCUMENTS

JP 2001232708 A * 8/2001
KR 10-2006-0081182 A 7/2006

(Continued)

OTHER PUBLICATIONS

English machine translation of KR 20230037769A to Lee; Mar. 17, 2023; B32B27/283; 26 pages. (Year: 2023).*

(Continued)

*Primary Examiner* — Linda L Gray

(74) *Attorney, Agent, or Firm* — Goldilocks ZONE IP LAW

(57) ABSTRACT

The present invention can be manufactured a recycled leather sheet treated with waterproof and flame retardant in a form of a sheet having a thickness of 10 to 500 mm, and maintains a weight of 700 to 1200 g/m$^2$ of a final recycled leather weight. In addition, natural fibers, synthetic fibers, and recycled yarns can be plantation treatment on recycled leather by needle punching process to realize the lightweight and flexibility of recycled leather sheet.

6 Claims, 2 Drawing Sheets

(56) References Cited

FOREIGN PATENT DOCUMENTS

| | | | |
|---|---|---|---|
| KR | 10-0829058 | B1 | 5/2008 |
| KR | 10-2009-0095044 | A | 9/2009 |
| KR | 10-2019-0124466 | A | 11/2019 |

OTHER PUBLICATIONS

English machine translation of KR 20230097740A to Park; Jul. 3, 2023; DON3/0059; 26 pages. (Year: 2023).*
English machine translation of JP 2001232708 (A) entitled Trim Material and Method of Manufacturing the Same; Yoshiteru et al.; published Aug. 28, 2001; 7 pages; B32B5/26. (Year: 2001).*

* cited by examiner

【FIG. 1】
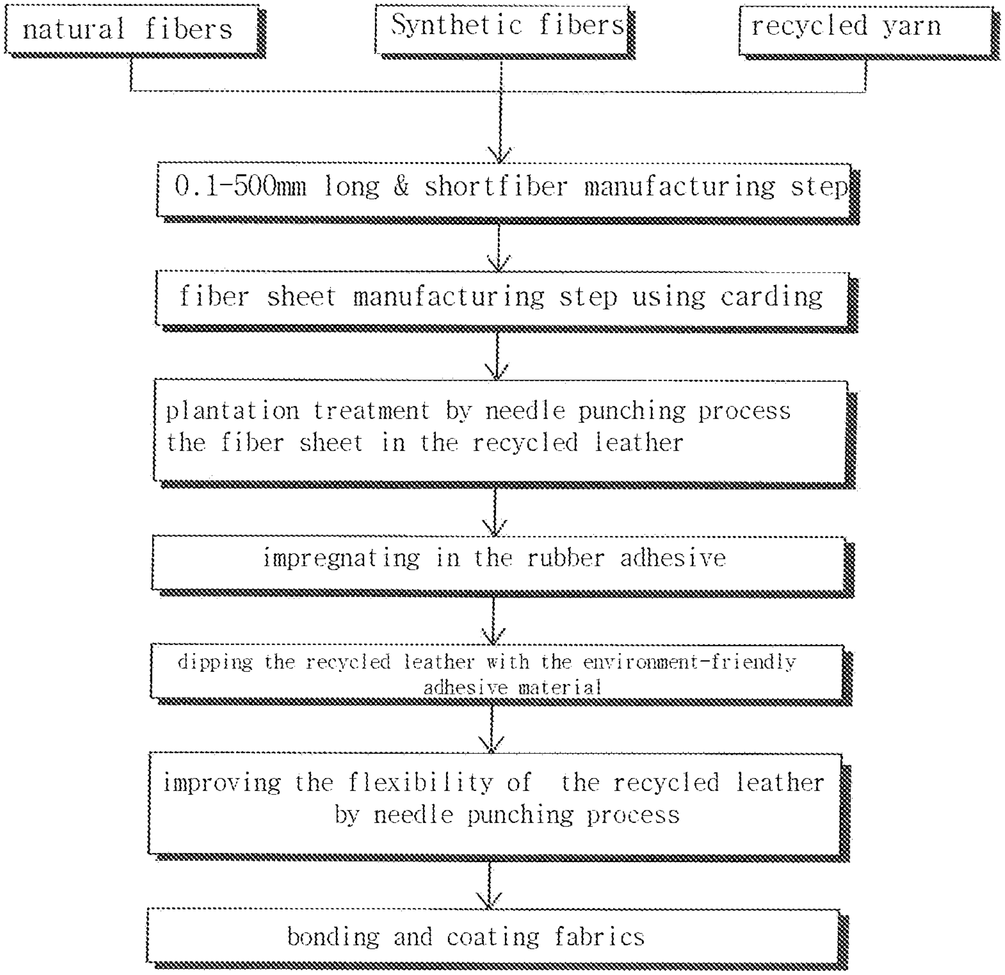

【FIG.2】
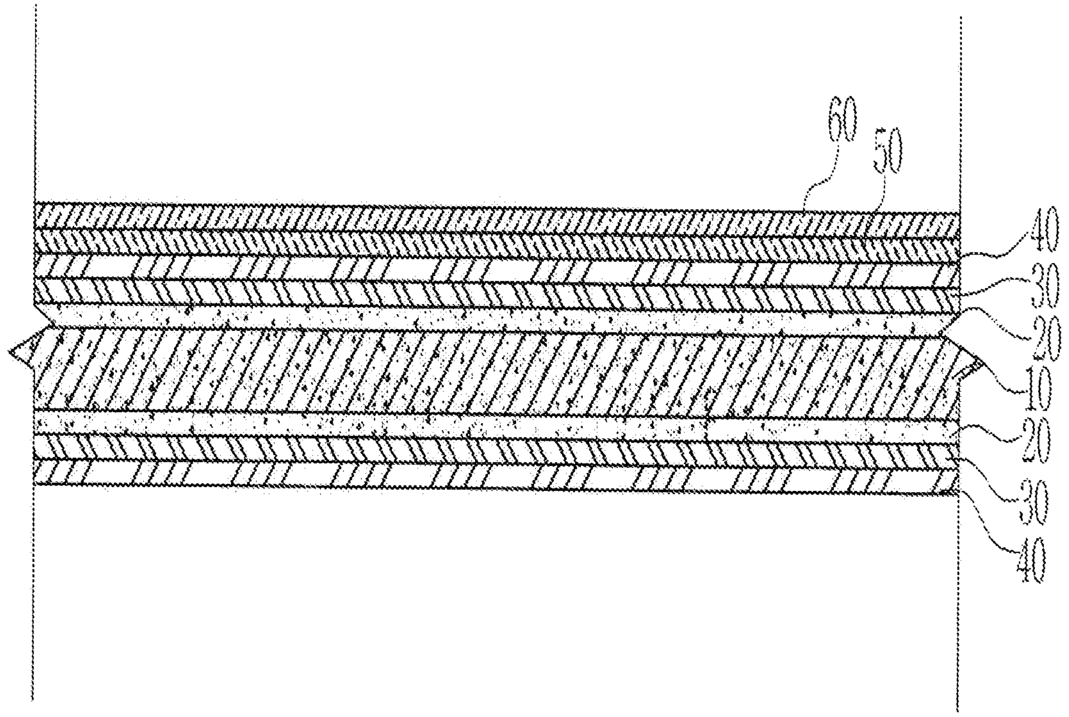

LIGHTWEIGHT AND FLEXIBLE WEB-STRUCTURED RECYCLED LEATHER SHEET AND A MANUFACTURING METHOD THEREOF

STATEMENT OF GOVERNMENT SUPPORT PROJECT

This invention was made with government support under the project number and the following:

[The Subject Generic No.] 1415180857

[Project No.] 20020768

[Name of Government Department] The Ministry of Trade, Industry and Energy

Address: 402, 12-13dong Hannuri-daero, Sejong-si, 30118 Republic of Korea

[Project Management Organization Name] Korea Planning & Evaluation Institute of Industrial Technology Address: 32 Cheomdan-ro 8-gil, Dong-gu, Daegu 41069 Republic of Korea

[Research Business Name] Automotive industry technology development-green car

[Research Project Name] Develop technology to commercialize interior materials and seats for future vehicles using recycled leather with a GRS of 70% or more in response to ESG transition

[contribution rate] 1:1

[Project implementation Organization Name] MUJIN CO., LTD

Address: 133 Sanmakgongdannam 11-gil, Yangsan-si, Gyeongsangnam-do 50568 Republic of Korea

[This Year Project Period] Apr. 1, 2022~Dec. 31, 2022

CROSS-REFERENCE TO RELATED APPLICATION

This application claims priority to Korean Patent Application No. 10-2023-0135844, filed on Oct. 12, 2023, and all the benefits accruing therefrom under 35 U.S.C. § 119, the contents of which in its entirety are herein incorporated by reference.

BACKGROUND

The present invention relates to a lightweight and flexible web-structured recycled leather sheet and a manufacturing method thereof. More particularly, the present invention relates to a method for manufacturing a recycled leather sheet having a web structure having light weight and flexibility by selectively mixing any one of natural fibers, synthetic fibers, recycled yarns, and the like or combinations thereof, manufacturing a non-woven fabric sheet through a carding process, and then performing a plantation treatment on the recycled leather through a needle punching process, thereby manufacturing a recycled leather sheet.

BACKGROUND OF THE INVENTION

Typically, a process of processing leather first may remove dirt and hair from a skin or a cattlehide through a water soaking and/or a lime soaking. The splitting process, also known as splitting, is a process that divides pelt after lime soaking into the desired thickness.

The tanning process uses chromium to denature animal proteins into mineral proteins. After these processes, a cattlehide may be adjusted its thickness according to the grade after watering so that the water content is 50~60%.

Moreover, a fabric in which the thickness is controlled, a leather fabric finally may be formed after dyeing, drying, milling, and embossing.

During the leather manufacturing process, waste and scraps such as powder or fragments left over from using the waste are generated. It is widely known how to recycle this waste or scrap to make a recycled leather. Patent documents related to this include Korean Patent Publication No. 10-2006-0081182, titled "a method of manufacturing sheets using leather waste," Korean Registered Patent No. 10-0829058, titled "a method of manufacturing sewingable recycled leather sheets using natural leather waste," and Patent Publication No. 10-2019-0124466, titled "a leather up-cycling method."

The disclosed Korean patent publication No. 10-2006-0081182, titled "a method for manufacturing a sheet using leather waste," discloses a method for manufacturing a recycled leather sheet, including the steps of: putting a shaving scrap piece in natural rubber or latex and treating the shaving scrap piece; putting a waterproofing agent and a flame retardant, etc. and solidifying after mixing and solidifying the shaving scrap piece with the waterproofing agent and the flame retardant; and compressing the solidified shaving scrap piece to manufacture a sheet.

Korean Patent No. 10-0829058, titled "a method of manufacturing a sewn recycled leather sheet using natural leather waste," relates to a method for manufacturing a recycled leather sheet: a nonwoven fabric board manufacturing step of separating and mixing fibers obtained by removing oil and fat from natural leather waste dipped in an organic solvent by length to form a shape like a loofah; a body board manufacturing step of making the pulverized natural leather waste, adding the natural rubber liquid, the chemical solvent and binder into the paper board shape of the constant thickness; an integration step of heating and pressing the nonwoven board and the body board to make one sheet; and a leather sheet manufacturing step of heating and drying the integrated sheet and then coating the surface with polyurethane.

Korean patent publication No. 10-2019-0124466, titled "leather up-cycling method," which includes: waste leather is collected, the up-cyclable leather is separated; an antibacterial liquid sprayed on the surface of the cut leather to suppress odor removal of the leather and growth of bacteria and fungi; a surface of the antibacterial-treated leather is heat-treated to remove foreign substances, to relax the leather tissue, and to smoothly sand the heat-treated leather surface; applying a binder acting as an adhesive to the sanded leather surface; a first dyeing step of coating the leather surface on which the binder is applied with a base color; embossed on the surface of the firstly dyed leather to produce various patterns; and method of up-cycling waste leather by coating the produced patterns with secondary dyeing.

However, the above art is due to a wet method of simply mixing and bonding the adhesive material latex by miniaturizing the leather waste, and the tensile and tear strength are very weak, and secondary pollution or environmental problems have occurred due to the use of excessive chemicals. In particular, the recycled leather sheet manufactured by the art has a problem that does not satisfy tensile strength, tear strength, flexibility, thickness, etc. required in various industrial fields, and thus has a limitation in applying the recycled leather sheet to products subjected to repeated external force and contact, such as household consumer goods such as automobile sheets, bags, and furniture.

As described above, the prior art is an invention for manufacturing a simple recycled leather sheet. The prior art is used only for decorative interior materials or wallpaper, and its use is extremely limited. It is difficult to apply the prior art to a product requiring durability and elasticity capable of withstanding repeated external force such as a sneaker or a vehicle seat and continuous contact with a user and an object.

In other words, due to the problem of not satisfying the tensile strength, tear strength, flexibility, and thickness required in various industries, there was a problem that PVC materials, fibers, and natural leather materials could not be used in bags and wallets, especially shoes such as sneakers, shoes, and casual shoes.

REFERENCES

Patent Documents

Patent Document 1: Korean Patent Publication No. 10-2006-0081182, titled, "Method for manufacturing sheets using leather waste," published on Jul. 12, 2006.

Patent Document 2: Korean Patent No. 10-0829058, titled "Method for manufacturing sewable and recycled leather seats using natural leather waste," issued on May 13, 2008.

Patent Document 3: Korean Patent Publication No. 10-2019-0124466, titled, "Leather upcycling method," published on Nov. 5, 2019.

Patent Document 4: Korean Patent Publication No. 10-2009-0095044, titled "Artificial Leather Seat and Manufacturing Method Thereof," published on Sep. 9, 2009.

EMBODIMENTS OF THE PRESENT INVENTION

Problems to be Solved

A method for manufacturing a recycled leather sheet of a web structure having light weight and flexibility and the recycled leather sheet of the web structure manufactured thereby are provided to manufacture a non-woven fabric sheet through a carding process after selectively mixing natural fiber, synthetic fiber, recycled yarn, and the like, and then transplanting the non-woven fabric sheet to the recycled leather through a needle punching process.

Another object of the present invention is to provide a method of manufacturing a web-structured recycled leather sheet having flexibility and light weight, and a web-structured recycled leather sheet manufactured by the method.

Another object of the present invention is to provide a method of manufacturing a web-structured recycled leather sheet having a flame-retardant function and a web-structured recycled leather sheet manufactured by the method thereof.

Another purpose of the present invention is to provide a recycled leather sheet of a web structure having light weight and flexibility capable of recycling low carbon environment-friendly resources by coating the recycled leather sheet with an environment-friendly non-polluting functional PU thermal hot melting thin film adhesion method and the manufacturing method thereof.

Another object of the present invention is to provide a method for manufacturing a recycled leather sheet having a web structure having light weight and flexibility by using a shaving scrap generated when a thickness is adjusted during a leather manufacturing process, various coating-coated leather cutting wastes generated in shoes, bags, car seats, and the like, and a fiber scrap generated during a fiber cutting process, and a recycled leather sheet having a web structure manufactured by the method thereof.

Means for Solving the Problems

The method for manufacturing a web-structured recycled leather sheet having light weight and flexibility according to aspect(s) of the present invention may include steps of: manufacturing a nonwoven fiber sheet by using a natural fiber, a synthetic fiber, and a recycled fiber alone or by selecting at least any one of the natural fiber, the synthetic fiber, and the recycled fiber, mixing the same, manufacturing a non-woven fiber sheet layer such as a nonwoven fabric in two or three layers through a carding process; processing a plantation treatment by a needle punching after the none-woven fiber sheet is put on the recycled leather; impregnating a plantation treatment recycled leather into a rubber-based adhesive; bonding and/or coating synthetic fibers on a surface of the recycled leather through the needle punching process; improving flexibility, soft texture, and physical strength of the recycled leather impregnated in the rubber-based adhesive or the recycled leather impregnated in the environment-friendly adhesive through a needle punching process; performing impregnating the surface-treated recycled leather as described above in the environment-friendly adhesive material for having a waterproofing and/or a fire retardant characteristic function; and drying the impregnated recycled leather and uniformly treating the surface of the recycled leather with a pressing roll process.

Effects of the Invention

According to aspects of the present invention, natural fibers, synthetic fibers, recycled yarns, and the like are used as a raw material, and a nonwoven fabric sheet is manufactured by a carding process in a manufacturing process, and the nonwoven fabric sheet is transplanted into the recycled leather through a needle punching process to manufacture the recycled leather sheet, thereby manufacturing the recycled leather sheet having a web structure and improving lightness and flexibility of a product.

In addition, aspects of the present invention can realize a flame-retardant function on the surface of the recycled leather sheet, and can manufacture a low-carbon eco-friendly product and a recycling effect of resources. In particular, a recycled leather sheet according to aspects of the present invention can be used in various industrial fields such as shoes, bags, wallets, and car seats due to light weight and flexibility.

BRIEF EXPLANATION OF DRAWINGS

FIG. 1 is a flowchart sequentially showing a method of manufacturing a recycled leather sheet having a web structure having light weight and flexibility according to a preferred embodiment of the present invention.

FIG. 2 is a cross-sectional view showing the configuration of a recycled leather sheet having a web structure having light weight and flexibility manufactured by the method shown in FIG. 1.

DETAILED EMBODIMENT

Hereinafter, a preferred embodiment of the present invention will be described in detail with reference to the accompanying drawings as follows: In the detailed description to be described later, a representative embodiment of the present invention will be presented to achieve the above-described technical problem. In addition, other embodiments that may be presented with the present invention are replaced with descriptions in the configuration of the present invention.

The term 'web structure' used in the present invention refers to a three-dimensional network structure, a structure in which fiber structures are intricately intertwined like a spider web.

Specifically, selecting any one or natural fibers, synthetic fibers, and recycled fibers are selectively mixed on the surface of the recycled leather, and the mixed natural fibers, synthetic fibers, and recycled fibers are manufactured into a nonwoven fiber sheet having two or three layers through a carding process.

This means a three-dimensional network structure in which the fibers penetrate into the recycled leather and are intricately intertwined with each other by treating the recycled leather with plantation treatment through a needle punching process.

In addition, the term 'sheet' or 'layer' used in the present invention means a form, which may include a sheet, a film, and/or plate form(s), unless the form is specifically mentioned.

Aspect(s) of the present invention is to realize a method of manufacturing a web-structured recycled leather sheet having a three-dimensional network structure by treating the recycled leather with plantation treatment through a needle punching process while using natural fiber, synthetic fiber, recycled yarn, etc. alone or selectively mixing the same and using the same as a fiber material.

At this time, the fibers are made of a sheet layer such as a nonwoven fabric through a carding process, preferably made of a nonwoven sheet in a form of a double or triple layer.

According to aspect(s) of the present invention, a recycled leather sheet manufactured by the above method realizes light weight and flexibility, has a resource recycling effect, and is a low-carbon eco-friendly product. The recycled leather sheet can be used in various industrial fields such as shoes, bags, wallets, and car seats. However, it is not limited thereto.

According to aspect(s) of the present invention, in manufacturing a web structure type recycled leather sheet, a recycled leather made by the manufacturing method disclosed in U.S. Pat. No. 10,207,476, titled "REINFORCED LEATHER" and U.S. Pat. No. 10,941,255, titled "METHOD FOR MANUFACTURING LIGHTWEIGHT FOAMED RECYCLED LEATHER AND RECYCLED LEATHER PRODUCED BY THE METHOD THEREOF" may be used. However, it is not limited thereto.

In other words, the method for manufacturing recycled leather disclosed in the above-mentioned U.S. patent is to remove shaving scraps, which are inevitably generated to control the thickness during a leather manufacturing process, and various paint-coated leather cuts generated from shoes, bags, car seats, etc. Waste (finished leather trimming scraps) is mixed at a ratio of 7:3 to 5:5 and shredded, then performing a usual wet method and drying process, and then foamed using a squeezing roller at a temperature of 60~120° C. And the waste is used to manufacture a recycled leather with a uniform thickness through a normal buffing process.

According to aspect(s) of the present invention, a recycled leather sheet having a web structure having light weight and flexibility can be manufactured by using the recycled leather mentioned above, or the recycled leather sheet of the present invention can be manufactured by using a general recycled leather manufactured by a conventional method. Of course, the recycled leather sheet of the present invention, which is made only by using general recycled leather, also has light weight and flexibility.

In the present invention, fibers are placed on the surface of a recycled leather, a nonwoven fabric sheet having a double or a triple layer is placed on the recycled leather by a carding process, and then a fiber (a nonwoven fabric sheet, hereinafter referred to as a nonwoven fabric sheet) is planted on the recycled leather by a needle punching process.

At this time, as the fibers used in the present invention, natural fibers, various synthetic fibers, recycled yarns, and the like can be used alone or at least one of them can be selected and mixed. The natural fibers include cotton, silk, fur, and the like, and synthetic fibers include polyethylene fibers and polyurethane fibers.

The natural fibers may include cotton, silk, fur, and the like, and synthetic fibers may include polyethylene fibers and polyurethane fibers. The recycled yarn may include polyethylene terephthalate (PET), poly lactic acid (PLA), and bio-fiber, and the like.

According to the aspect(s) of the present invention, a dipping process is performed to impregnate a recycled leather after plantation treatment by a needle punching process into a rubber-based adhesive such as latex, and then drying the same and pressing the surface of the recycled leather with a squeezing roller is performed.

This is to smooth the fibers exposed to the surfaces (front and back) of the recycled leather, wherein the fibers may be natural fibers, synthetic fibers, recycled yarns, or a mixture thereof.

According to aspect(s) of the present invention, the recycled leather having a smooth surface is passed through a needle punching machine (M/C) once or twice to realize flexibility, improve physical strength, and produce a recycled leather sheet having a web structure.

According to aspect(s) of the present invention, various materials can be coated on the surface of the recycled leather sheet. For example, the recycled leather sheet can be coated by a water-based coating method having a flame-retardant function or an environmentally-friendly non-polluting functional polyurethane hotmelt thin film bonding method.

Hereinafter, a method of manufacturing a recycled leather sheet having a web structure having light weight and flexibility of the present invention will be described in detail with reference to the drawings.

As shown in FIG. 1, a method for manufacturing a recycled leather sheet according to the present invention may include:

- Step 1) natural fibers such as cotton, silk, and fur, and various synthetic fibers such as polyethylene fibers or polyurethane fibers, fibers and recycled yarns including PET, are made into long and short fibers with a length of 0.1 to 500 mm, then these are used individually or at least one of them is selected and mixed, and then processed through the usual carding process or pressed with a squeezing roller to form sheets with a thickness of 10 to 500 mm, That is, the step of manufacturing a non-woven fiber sheet;
- Step 2) placing the fiber sheet of the step 1 on top of the recycled leather and then passing it through a needle punching machine (M/C) for a plantation treatment;

Step 3) impregnating the recycled leather of the step 2 with a rubber-based adhesive such as latex to smooth the surface of the recycled leather, i.e., a dipping treatment;

Step 4) after drying the recycled leather after dipping treatment in the step 3, passing it through a pressing roll to evenly treat the surface of the recycled leather;

Step 5) impregnating the recycled leather that has gone through the step 4 with eco-friendly binding materials including polyurethane to have waterproof and flame-retardant functions;

Step 6) passing the recycled leather of the step 5 through the needle punching M/C once or three or more times to ensure that the recycled leather has flexibility and a soft texture; and Step 7) manufacturing a recycled leather sheet of the present invention by combining synthetic fibers with the recycled leather that has passed step 6 above.

The manufacturing method of the present invention can be manufactured in a form of a sheet having a thickness of 0.1 to 50 mm, maintains a weight of 700 to 1200 g/m$^2$ of final recycled leather, and can be manufactured as a recycled leather sheet treated with water proof and flame retardant.

In addition, an aspect of the present invention can realize light weight and flexibility of the recycled leather sheet by planting treatment of natural fibers, synthetic fibers, recycled yarns, and the like in the recycled leather through a needle punching process. For example, according to aspect(s) of the present invention, preferably a recycled leather may have 700-1,100 g/m$^2$ of lightweight and/or may have greater than 2.5 mm of softness.

According to the present invention, the recycled leather sheet manufactured by the manufacturing method may include: a low carbon eco-friendly product can be manufactured by recycling a shaving scrap generated during a leather manufacturing process and finished leather trimming scraps generated in shoes, bags, car seats, etc. as well as being usable for a seat sheet for transportation (for example, a vehicle, a ship, an aircraft, etc.) including materials for shoes, bags, and sofas. In addition, a recycling effect of resources can be realized.

Hereinafter, a method of manufacturing a recycled leather sheet having a web structure having light weight and flexibility according to the present invention will be described in detail, and the present invention will be described through preferred embodiments that can be easily performed by a person with ordinary skills in the art to which the present invention belongs.

Embodiments

FIG. 1 is a diagram sequentially showing a method of manufacturing a recycled leather sheet having a web structure having light weight and flexibility according to a preferred embodiment of the present invention. FIG. 2 is a diagram showing the configuration of a recycled leather sheet having a web structure having light weight and flexibility manufactured by the method shown in FIG. 1.

Referring to FIGS. 1 and 2, a method for manufacturing a recycled leather sheet having a web structure having light weight and flexibility according to the present invention include: the steps of: using a recycled leather made by a manufacturing method of the present invention or a recycled leather manufactured by a conventional method as a main material; and a method of manufacturing the recycled leather sheet by planting a nonwoven fabric sheet made of natural fibers, various synthetic fibers, recycled yarns, etc. on the surface of the recycled leather through a needle punching process. That is to manufacture a recycled leather by performing a plantation treatment by a needle punching. The method may include the following 7 steps.

Step 1: This is the step where natural fibers, synthetic fibers, recycled yarns, etc. are used alone or one or more of them is selected and mixed, and then manufactured into a fiber sheet with a thickness of 10 to 500 mm.

Natural fibers used in the present invention may include cotton, silk, or fur, and synthetic fibers may include polyethylene fibers or polyurethane fibers. A recycled fiber may refer to a general recycled fiber and may be PET as an example.

According to the present invention, the natural fibers and various synthetic fibers and recycled fibers can be made of long and short fibers having a length of 0.1 to 500 mm, and then used as each fiber alone, or one or more of the fibers can be selected and mixed.

A selected fiber or a mixed fiber is pressed by a conventional carding process and a squeezing roller to produce a nonwoven fiber sheet having a thickness of 10 to 500 mm. In this case, a nonwoven fabric sheet in two or three layers may be formed according to aspect(s) of the present invention. However, it is not limited thereto.

According to an aspect of the present invention, the natural fibers, synthetic fibers, and recycled yarns described above are used alone or in combination, wherein the mixing ratio can be uniformly mixed in a ratio of natural fibers, synthetic fibers, and recycled yarns in a ratio of 7:3:1, 6:2:2, or 5:3:2.

In this way, individual or mixed fibers are passed through a conventional carding roller equipped with a needle, and then pressed with a conventional squeezing roller to form a fiber sheet. At this time, it is desirable to mold the fiber sheet thinly to a thickness.

Step 2: a step of placing the fiber sheet passed through the step 1 on recycled leather and performing a plantation treatment through a needle punching process.

In this case, various needles can be used in the needle punching process, and preferably, an arrowhead or a needle having a barb shape of a fishing needle can be used.

The recycled leather used in the present invention may include shaving scraps generated during a general leather manufacturing process, and recycled leather mixed and crushed in a ratio of 7:3 to 5:5 (including painted leather cutting waste) generated during a manufacturing process of shoes, bags, car seats, and the like, and made by a conventional wet method.

In addition, the present invention is capable of mixing and crushing the washing pieces and various leather cutting wastes, and then using recycled leather made by a general dry method.

According to aspects of the present invention, a recycled leather made by the manufacturing method disclosed in U.S. Pat. No. 10,207,476, titled "Reinforced Leather" and U.S. Pat. No. 10,941,255, titled "Method for Manufacturing Lightweighted Foamed Recycled Leather and Recycled Leather Ceramic Products by the Method Thereof" may be used.

According to aspects of the present invention, a recycled leather made by the above method and a nonwoven fiber sheet made of a double layer or a triple layer made by the step 1 are treated with a plantation treatment by a needle punching process. More specifically, the recycled leather having a web structure of a two-layer structure is manufactured by placing the fiber sheet passed through the step 1 on the recycled leather and transplanting the fiber sheets while slowly passing the fiber sheets through a needle punching machine (M/C).

At this time, the plantation treatment condition (plantation working condition) of the needle punching machine is shown in Table 1 below.

TABLE 1

| Plantation treatment method | Plantation treatment condition |
|---|---|
| Treatment speed | 2.5~10.0 m/min |
| Machine speed per minute(RPM) | 800~1,200 RPM |
| Needle cap | 2~8 mm |
| Needle depth | 5.5~10.5 mm |
| Number of needles | 10,000~20,000 |
| Needle standard size | #40, FWD-D3063 40RB, 2 × 2 × 2 |
| Neeld shape | Barb shape |

According to aspect(s) of the present invention, a non-woven fabric sheet is planted on the recycled leather by a needle punching process, i.e., a plantation treatment is performed. A purpose according to aspects of the present invention is to supplement tearing strength characteristics of the recycled leather sheet, to provide natural texture and softness, and to provide a quality similar to that of the natural leather sheet.

Step 3: This is a step in which the surface of the recycled leather is smoothened by dipping treatment of the recycled leather with a rubber-based adhesive or a water-soluble PU-based adhesive.

Fibers exposed on the front and back of the recycled leather, specifically, during the process of the non-woven fiber sheet that has passed step 1 being treated with the recycled leather through the needle punching process in step 2, the fibers may be protruded from the front and back of the recycled leather.

In order to smooth the fibers exposed on the surface (front and back) of the recycled leather, a dipping process is performed to impregnate the recycled leather with a rubber-based adhesive such as latex, i.e., dipping process is performed.

Step 4: After drying the recycled leather that has gone through step 3 above, the surface of the recycled leather is treated uniformly through a squeezing roller process.

In other words, this is a step to improve the homogeneity of the surface of the recycled leather.

Step 5: a step of dipping process of the recycled leather that has gone through step 4 into eco-friendly binding materials including polyurethane.

Aspects of the present invention can use a water-soluble PU-based adhesive material as an eco-friendly adhesive material. According to aspects of the present invention, the recycled leather that has gone through step 4 described above can be impregnated with an eco-friendly adhesive material, and can also be impregnated with a waterproofing agent and a flame retardant to provide waterproofing and flame retardant functions.

Step 6: This is the step of improving the flexibility, soft texture, and physical strength of the recycled leather that has gone through step 5 above through a needle punching process. At this time, it is preferable to perform the needle punching process once or twice, and it can be performed more times depending on the quality control situation of the product.

If the manufacturing process of step 6 is performed, the recycled leather sheet of the present invention not only provides a soft texture, but also provides physical strength (strengthening the fiber structure), strengthens adhesion, and improves peel strength. In particular, it is possible to manufacture recycled leather sheets with quality characteristics similar to natural leather.

The recycled leather sheet is thinly formed to a thickness of 10 to 500 mm through a needle punching process, and is manufactured as a recycled leather sheet with a three-layer web structure.

According to aspects of the present invention, the needle punching process of step 6 can be performed on the recycled leather that has undergone step 3, specifically, the recycled leather impregnated with a rubber-based adhesive. At this time, it is desirable to perform the needle punching process once or twice, and may be performed more times depending on the quality control situation of the product.

Fibers exposed to the front surface and the rear surface of the recycled leather, specifically, the nonwoven fiber sheet which has passed through the step 1 protrude to the front surface and the rear surface of the recycled leather during a process of transplanting the nonwoven fiber sheet to the recycled leather by the needle punching step of the step 2.

Step 7: a step of manufacturing a recycled leather sheet of the present invention through a cloth combining process and a coating process of synthetic fibers of the recycled leather of the step 6;

In this case, the painting process is to implement various surface treatment effects of the recycled leather sheet. The painting process is a process of painting and finishing in various ways such as a spray method, a padding method, a roll coating method, and a digital printing method.

As shown in FIG. 2, a recycled leather sheet made by the manufacturing method of the present invention is preferably made through the manufacturing process of step 1 to step 7, which includes: a nonwoven fabric sheet layer 20 transplanted by a needle punching process is formed on both surfaces of the recycled leather layer 10; rubber-based adhesive layer 30 is formed on both surfaces of the nonwoven fiber sheet layer 20 by an impregnation process, i.e., a dipping process; and polyurethane layer 40 is formed on both surfaces of the rubber adhesive 30 by an impregnation process. In addition, if necessary, a synthetic fiber layer 50 and a coating layer 60 made through the above-described step 7 may be formed on the upper surface of the polyurethane layer 40.

The recycled leather sheet of the present invention, which is composed of various sheet layers, can realize light weight of 700-1200 g/m$^2$ compared to the weight of the final recycled leather, and can realize fullness, tightness, and softness. In addition, waterproof and flame-retardant functions can be realized through the manufacturing process of step 5.

According to aspect(s) of the present invention, the recycled leather sheet can be used as a low carbon eco-friendly resource recycling composite material which can be used for a seat sheet (for example, a vehicle, a ship, an aircraft, etc.) for transportation, including materials for shoes, bags, and sofas.

| [explanation of symbols] |
|---|
| 10: Recycled leather layer |
| 20: Non-woven fiber sheet layer |
| 30: Rubber-based adhesive layer |
| 40: Polyurethane layer |
| 50: Synthetic fiber layer |
| 60: coating layer |

What is claimed is:

1. A method of manufacturing a web-structured recycled leather sheet, comprising:

manufacturing a non-woven fiber sheet in a form of a non-woven fabric by mixing at least any one of natural yarn fiber, synthetic fiber, and recycled yarn, or combination thereof;

performing plantation treatment by a first needle punching process after putting the non-woven fabric sheet on a recycled leather, thereby producing a plantation treated recycled leather;

impregnating the plantation treated recycled leather with a rubber-based adhesive, thereby manufacturing the recycled leather sheet of web structure; and performing a second needle punching process for the impregnated recycled leather with the rubber-based adhesive, wherein a thickness of the non-woven fiber sheet is 10 to 500 mm, when using a mixture of natural fiber, synthetic fiber, and recycled yarn, a mixing ratio is natural fiber: synthetic fiber: recycled yarn of 7:3:1, 6:2:2, or 5:3:2, wherein the non-woven fiber sheet is symmetrically composed of two layers.

2. The method of manufacturing the web-structured recycled leather sheet of claim 1, further comprising:

drying the impregnated recycled leather and uniformly treating on a surface of the impregnated recycled leather by a pressing roll process, thereby producing a surface-treated recycled leather.

3. The method of manufacturing the web-structured recycled leather sheet of claim 2, further comprising impregnating the surface-treated recycled leather with an eco-friendly adhesive material.

4. The method of manufacturing the web-structured recycled leather sheet of claim 1, further comprising combining synthetic fibers with a surface of the plantation treated recycled leather or painting on the surface of the plantation treated recycled leather.

5. The method of manufacturing the web-structured recycled leather sheet of claim 1, wherein the non-woven fiber sheet comprises: preparing 0.1~500 mm long and short fibers using at least any one of natural yarn fiber, synthetic fiber, and recycled yarn, and then mixing at least any one of the long and short fiber, thereby producing the non-woven fiber sheet.

6. A recycled leather sheet of the web web-structured recycled leather sheet manufactured with the method of claim 1, wherein the method comprising:

manufacturing a non-woven fiber sheet in a form of a non-woven fabric by mixing at least any one of natural yarn fiber, synthetic fiber, and recycled yarn, or combination thereof;

performing plantation treatment by a needle punching process after putting the non-woven fabric sheet on a recycled leather, thereby producing a plantation treated recycled leather;

impregnating the plantation treated recycled leather with a rubber-based adhesive, thereby manufacturing the recycled leather sheet of web structure; and performing a second needle punching process for the impregnated recycled leather with the rubber-based adhesive.

* * * * *